United States Patent [19]

Gallina

[11] 4,168,081
[45] Sep. 18, 1979

[54] MOTORCYCLE STEERING GEAR

[76] Inventor: Roberto Gallina, 46 via del Popolo, La Spezia 19100, Italy

[21] Appl. No.: 804,444

[22] Filed: Jun. 7, 1977

[30] Foreign Application Priority Data

Oct. 28, 1976 [IT] Italy ................ 16707 A/76

[51] Int. Cl.² ............... B62D 61/02; B62K 11/12; B62K 11/14
[52] U.S. Cl. .................... 280/270; 180/223
[58] Field of Search .............. 180/29, 30; 280/263, 280/270, 271, 272, 274, 279

[56] References Cited

U.S. PATENT DOCUMENTS

| 477,583 | 6/1892 | Bibber | 280/270 |
| 669,201 | 3/1901 | Hehr | 280/270 X |
| 1,132,771 | 3/1915 | Handy | 280/270 |
| 1,175,744 | 3/1916 | Giles | 280/270 |
| 1,186,695 | 6/1916 | Slocomb | 280/270 |
| 3,556,557 | 1/1971 | Blair | 280/279 |

Primary Examiner—Francis S. Husar
Assistant Examiner—Terrance L. Siemens
Attorney, Agent, or Firm—Thomas E. Beall, Jr.

[57] ABSTRACT

A planetary gear reduction unit is drivingly connected between the handlebars and front fork of a motorcycle for steering. The handlebar is coaxially mounted for rotation with respect to the front fork of the motorcycle; sector gears are respectively mounted on the front fork and handlebar for respectively engaging rigidly innerconnected spur gears rotatably mounted on a carrier that is fixed to the vehicle frame to provide a gear reduction so that there is a reduction of the angular movement of the fork with respect to that of the handlebar.

2 Claims, 3 Drawing Figures

U.S. Patent
Sep. 18, 1979
4,168,081
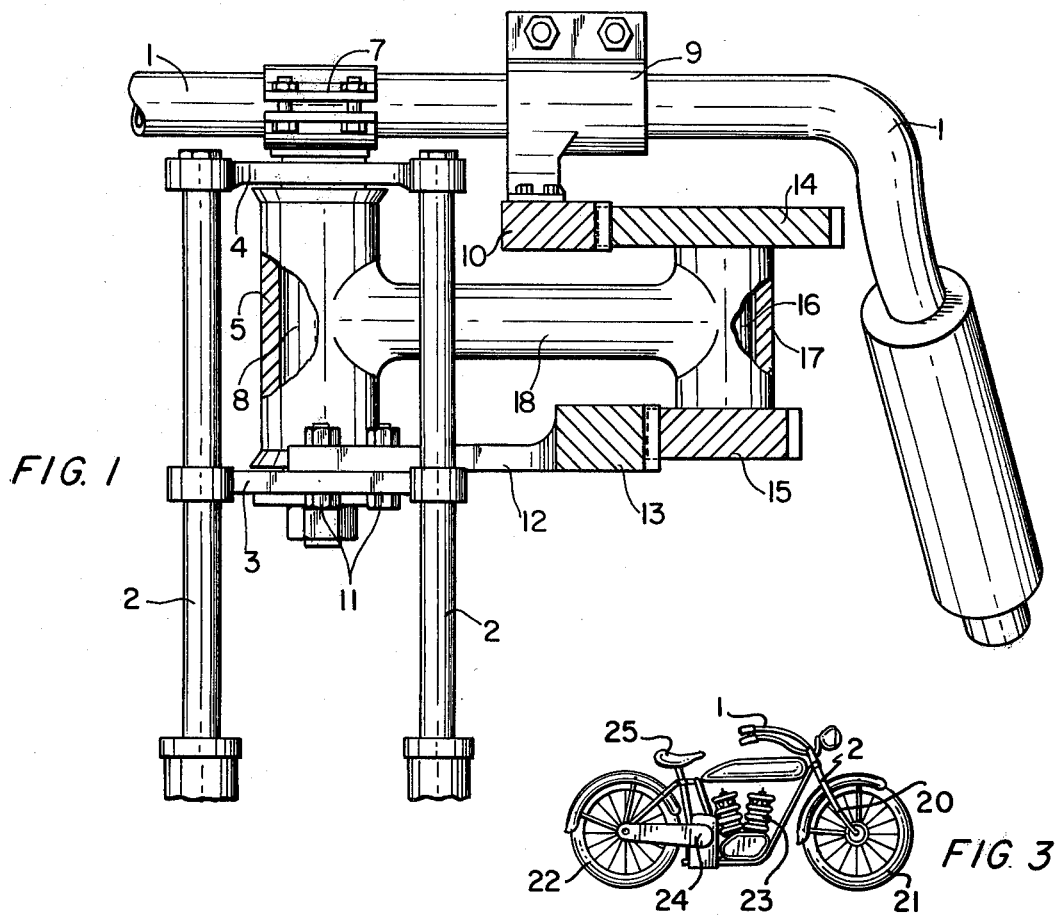
FIG. 1
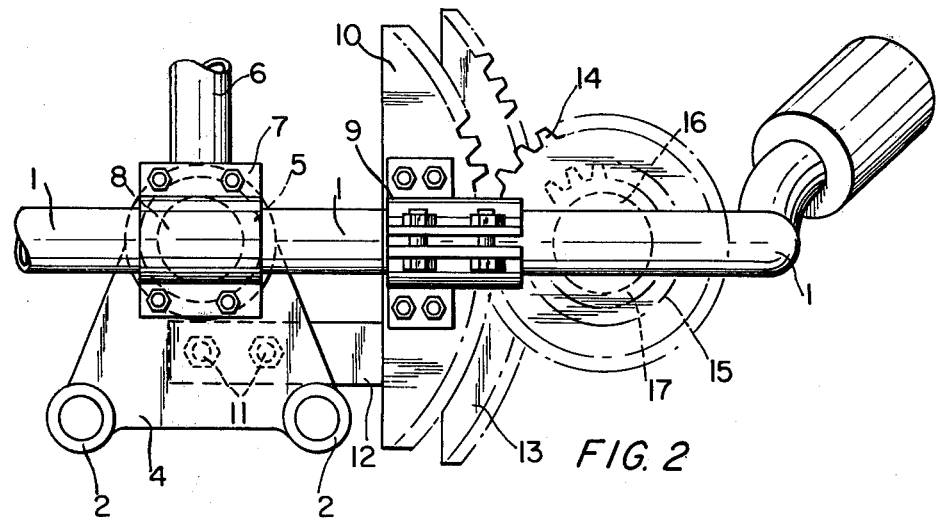
FIG. 3
FIG. 2

MOTORCYCLE STEERING GEAR

BACKGROUND OF THE INVENTION

In motorcycles the steering is nowadays merely constituted by a handlebar which is rigidly affixed to the front fork that bears the steering steerable wheel. It is obvious that the wider the handlebar is the larger the lever arm will be and, thus, the less the effort to be exerted in order to steer the motorcycle.

There are however, cases in which the handlebar must be particularly narrow, as in the case of racing motorcycles, where the rider must adopt a very compact position because the handlebar must be kept within the aerodynamic profile of the front protective shield. Under such conditions, the rider has a very reduced handlebar lever on which to act for the steering and, therefore, to maintain the performance of the motorcycle. However, particularly in competition it occurs that the rider at the end of each curve accelerates the speed and subjects the motorcycle, which is in a very slanted position, to a demand that transmits vibrations and backlash to the steering which is difficult for the rider to control.

SUMMARY OF THE INVENTION

The present invention has the aim of eliminating or, at least, reducing to a great extent said drawback and provides the handlebar no longer rigidly affixed to the front fork, but independently from it and mechanically linked to it by means of a device which reduces the rotory movement that is imparted from the handlebar to the fork. Thus, the rotation of the handlebar is increased in regards to the rotation of the fork and, therefore, the effort of the rider is reduced while said mechanical device does also serve as a shock absorber for the vibrations and backlash of the steerable wheel, rendering a smoother and safer steering.

The device in question has further the aim of supporting a front steerable wheel with a section larger than that of the traditional tires.

The new device has already been constructed and installed on a racing motorcycle equipped with a front steering tire and it has been successfully tested on the Rimini racecourse.

The mechancial device for the reduction of the angular movement of the fork in regards to the handlebar is preferably achieved by means of grears but it can also be accomplished by means of levers, as explained below.

BRIEF DESCRIPTION OF THE DRAWING

Further objects, advantages and features of the present invention will become more clear from the following description of a preferred embodiment shown in the drawing, wherein:

FIG. 1 shows the partial front view of the handlebar and of the fork equipped with the mechanical device of reduction of the amplitude of rotation in accordance with the invention;

FIG. 2 shows the top view of the unit in accordance with FIG. 1; and

FIG. 3 shows a side view of a motorcycle.

DETAILED DESCRIPTION

FIG. 3 shows a motorcycle with front wheel 21 and rear wheel 22. The lower end 20 of front fork 2 supports wheel 21 which is steered via handle bars 1. The operator's seat 25 is located above internal combustion engine 23 and transmission 24.

In the drawing, 1 indicates the handlebar (partially sectioned) and 2 indicates the supports of the fork, which in their lower portion support the steerable wheel (not shown).

The supports of the fork 2 are affixed on their upper parts to triangular plates 3, 4. Between said plates there is provided a tube 5 which is rigidly attached to the frame 6 of the motorcycle and rotatably mounted relative to the plates by means of a pin 8 which acts as center of rotation of the handlebar and of the fork.

In the prior art the handlebar is rigidly attached to one of or to both of the plates, in such a manner that the rotation of the handlebar be directly transmitted to the plates, to the fork and to the steering tire, giving cause to the regretted disadvantage that the muscular effort of the driver is proportionally increased with a very small handlebar and lever arm. In other prior art constructions, always exhibiting the same disadvantage, on the head of the fork is provided a pin which, through the tube 5, is directly attached to the handlebar.

In order to obviate this disadvantage of the prior art, there is provided, in accordance with the present invention, the handlebar 1 rotatably mounted relative to the plates 3 and 4 and from the fork 2. To the handlebar 1 is affixed, with a central clamp 7 or by similar means having the same purpose, a threaded pin 8 which is free to rotate inside of the tube 5 but not rigidly attached to the fork. On the handlebar 1 is centrally affixed a toothed segment 10 by means of a clamp 9, or by other means with the same purpose.

On the bottom plate 3 of the fork there is affixed by means of bolts 11, or by other means with the same purpose, a bracket 12 that bears another toothed segment 13 with a diameter larger than that of segment 10.

The two toothed segments 10, 13 are mechanically linked between them by means of the toothed wheels 14, 15, which are rigidly linked to each other by means of a pin 16. The pin 16 is free to rotate inside of a tube 17 which, in turn, is rigidly affixed by means of the arm 18 to the tube 5 attached to the frame of the motorcycle. The toothed wheel 14 has a diameter larger than that of the toothed wheel 15. Thus set up, it results that each movement of rotation of the handlebar 1 is transmitted by means of the toothed segment 10, the toothed wheel 14, the pin 16, the toothed wheel 15, the toothed segment 13, the bracket 12, the plate 13 and the fork 2 to the steerable wheel.

Since the toothed segment 10 presents a diameter smaller than that of the toothed segment 13 and consequently the toothed wheel 14 has a diameter larger than that of the toothed wheel 15, it results that angular movement of the handlebar produces an angular movement of the fork and of the steerable wheel that is reduced based on the ratio of the diameters of the toothed wheels and of the toothed sectors.

In such a manner therefore, in accordance with the invention, there is reduced in the steering of the motorcycle the muscular effort to be exerted by the driver, expecially useful in motorcycles with handlebars with a very short lever arm.

Obviously, in the tubes 5, 17 there can be provided ball bearings in such a manner as to exercise the least possible friction on the pins 8, 16.

In an alternative manner instead of the toothed wheels 14, 15 and of the toothed segments 10, 13 there can be provided lever arms in proportion to the respective lengths in such a manner as to bring about the reduction of the angular movement which is transmitted from the handlebar to the fork, and achieving thus the same aim of the invention.

Naturally, the invention described by way of a preferred embodiment and not limitatively, may undergo variations and be subject to adaptions due to particular needs, as well as be provided with replacements of parts with other analogous ones, but always within the framework of the following claims.

What is claimed:

1. A motorcycle, comprising: a rigid frame having a central vertical plane of general symmetry; a rear wheel mounted on said frame within said plane for rotation about a horizontal axis fixed with respect to said frame; a front wheel; a front fork having means at its lower end for supporting the front wheel of the motorcycle for rotation about a horizontal axis with respect to the front fork, and having means at its upper end rotatably mounting it on said frame for rotation about a generally vertically extending axis within said plane so that rotation of said front fork about its vertically extending axis will correspondingly rotate the horizontal axis of the front wheel for the steering of the motorcycle, with one position of the front wheel being within said plane; an internal combustion engine mounted on said frame; transmission means drivingly connected between said internal combustion engine and said rear wheel for driving said rear wheel; an operator seat mounted on said frame generally within said plane and between said front and rear wheels; a handlebar having spaced apart hand grips to be grasped by the driver of the motorcycle during steering of the motorcycle; means rotatably mounting said handlebar on said frame forwardly of said seat for rotation about a generally vertically extending axis generally coaxial with the vertically extending axis of said front fork; a first sector gear rigidly secured to said handlebar with an arcuate array of gear teeth concentric with said vertically extending axis of said handlebar; a second sector gear rigidly secured to said front fork with an arcuate array of gear teeth generally concentric with said vertically extending axis of said front fork; and spur gear means having teeth inter engaged with said first sector gear teeth, having teeth inter engaged with said second sector gear teeth, being mounted on said frame for rotation about a generally vertical axis that is stationary with respect to said frame and spaced a substantial distance from said axes of said front fork and handlebar, and positively intergearing said handlebar and said front fork so that angular rotation of said handlebar will produce a corresponding and lesser angular rotation of said front fork in a fixed ratio.

2. The motorcycle of claim 1, wherein said front fork includes two parallel spaced apart and vertically extending front wheel supports, two spaced apart and generally parallel plates, each of said plates being secured to both of said wheel supports at the upper end of said wheel supports and each being rotatably mounted on said frame about said vertically extending axis of said front fork; said axes of said front fork and said handlebar being coextensive and said axis of said spur gear means being parallel to said front fork axis; said frame including a rigid cylindrical bearing tube extending between said plates; and said means rotatably mounting said handlebar and said front fork including a pivot pin rigidly secured to said handlebar and coextensive with said vertically extending axis of said front fork; said pivot pin extending through said cylindrical bearing tube of said frame and said pivot pin extending through aligned bearing aperatures in said plate.

* * * * *